United States Patent [19]

Berrido et al.

[11] Patent Number: 4,747,880

[45] Date of Patent: May 31, 1988

[54] DRY, GRANULAR MAINTENANCE PRODUCT RECONSTITUTABLE TO AN AQUEOUS CLEAN AND SHINE PRODUCT

[75] Inventors: Colin Berrido, Surrey, United Kingdom; Alfred E. Kilsdonk, Racine, Wis.

[73] Assignee: S. C. Johnson & Son, Inc., Racine, Wis.

[21] Appl. No.: 45,903

[22] Filed: May 1, 1987

Related U.S. Application Data

[63] Continuation of Ser. No. 680,709, Dec. 12, 1984, abandoned.

[51] Int. Cl.$^4$ ............................ C08L 5/00; C11D 3/06
[52] U.S. Cl. .................................... 106/207; 106/208; 252/135; 252/174.23; 252/174.17; 252/174.24; 524/55; 524/77

[58] Field of Search ................. 106/3, 5, 10, 270, 207, 106/208; 252/89.1, 135, 140, 155, 160, 174, 174.14, 174.23, 174.24, 174.17, DIG. 2, DIG. 3; 524/475, 55, 77

[56] References Cited

U.S. PATENT DOCUMENTS 4,151,138  4/1979  Citrone et al. ...................... 524/475

Primary Examiner—Prince E. Willis

[57] ABSTRACT

Floor care and cleaner products which can be rapidly reconstituted in water are described. The product comprises granules having an unpacked bulk density of from about 0.3 to 0.8 g/cm$^3$ uniformly containing an alkaline builder and an alkali-soluble film-former bonded together with a water-soluble binding agent. The alkaline builder serves the dual function of a cleaner and a solubilizing agent for the film-former component.

7 Claims, No Drawings

DRY, GRANULAR MAINTENANCE PRODUCT RECONSTITUTABLE TO AN AQUEOUS CLEAN AND SHINE PRODUCT

REFERENCE TO RELATED APPLICATION

This application is a continuation of patent application Ser. No. 680,709, filed Dec. 12, 1984 now abandoned, the benefit of which is now claimed for purposes of priority pursuant to 35 U.S.C. §120.

FIELD OF INVENTION

The present invention is directed to an improved floor care product and to a process of producing the improved floor care product. More particularly, the invention is directed to a dry, granular maintenance product primarily in the floor care area and may be used on ceramic and plastic surfaces other than flooring, which is readily solubilized in water to provide a solution which both cleans and shines. The dry, granular product is preferably produced by utilizing a fluidized bed granulator.

BACKGROUND AND PRIOR ART

Aqueous, bright-drying floor polishes and aqueous floor care polishes which are buffable to obtain a shine have been extensively developed over the past thirty years. The bright-drying floor polishes generally comprise aqueous emulsions including a water-insoluble film-former, which is either wax or a waxy resin, together with a resin containing carboxyl groups which can be solubilized in water by neutralizing the carboxyl content of the resin with ammonia, borax, or a similar type alkaline material. The buffable compositions contain materials similar to the components of a bright-drying polish, but generally utilize larger amounts of waxy materials which, when the polishes are applied to a hard surface, such as a floor, can be buffed to a bright shine. These products which are largely self-maintaining are conventionally removed or stripped from the floor periodically and new coatings applied. More recently, floor care products which both clean and shine have been developed, such as Brite ® manufactured and sold by S. C. Johnson & Son, Inc., Racine, Wis., the assignee of the present application. Floor care products whether bright drying or buffable polishes or of the clean and shine type are conventionally sold to the consumer as aqueous emulsions. As is apparent the major part of such emulsions is water and, accordingly, the cost of the product to the consumer is increased because of transportation and packaging costs.

Solid floor care products which can be reconstituted in water to provide bright-drying or optionally rebuffable floor finish have been suggested. For example, U.S. Pat. No. 4,151,138 in disclosing such a product states that typical aqueous coating compositions which may include plasticizers and cleaning compositions including detergent salts and builders can be spray dried to provide a dry, solid composition which contains sufficient alkaline reacting compound to provide a composition which can be reconstituted in water to provide a bright drying or rebuffable floor finish. The products described in the aforesaid patent and in other prior art, although in principle providing reconstitutable clean and shine floor care products, are not completely acceptable as a commercial product in that the compositions are not completely soluble in water and/or cannot be readily solubilized merely by adding water at low water temperature, and/or do not have adequate film-forming content.

OBJECTS AND GENERAL DESCRIPTION OF INVENTION

Accordingly, a primary object of the present invention is to provide a dry, ranular floor care product which is readily solubilized in water at low temperature to provide an aqueous solution or dispersion which cleans and shines.

It is another object of the present invention to provide a dry, granular floor care composition which is readily solubilized in water at low temperature to provide an aqueous solution or dispersion which cleans and is buffable to a bright shine.

It is another object of the present invention to provide a dry, granular floor care composition which is readily solubilized in water at low temperature wherein the floor care compositions has an unpacked bulk density of from about 0.3–0.8 g/cm$^3$, and preferably 0.4–0.6 g/cm$^3$ to permit rapid solubilization in water.

It is another object of the present invention to provide a dry, granular floor care composition having a high film-forming content, with the granules having uniform composition, high bulk density, good wetting, and high water solubility at low water temperature.

It is another object of the present invention to provide a process for producing a dry, granular floor care composition having high film-forming content, uniform composition, and high bulk density to provide good wetting of the granules and rapid water solubility at low water temperature.

It is another object of the present invention to provide a dry granular floor care formulation which can be reconstituted by the addition of water, to form a conventional liquid bucket dilutable mainteance product. This liquid formula could then be sold as a finished item.

These and other objects of the present invention will be apparent from the following general descriptions and the presently preferred embodiments.

The objects of the present invention are accomplished by blending as essential components a powdered alkaline builder and a powdered film-forming material, preferably in the presence of a water-softening or chelating material. Thereafter, a binder is added to the powdered blend, preferably by fluidizing the components in a fluidized bed granulator to bond the powder particles together to form granules. The blended components bonded together with the binder are dried to provide a product having an unpacked bulk density between about 0.3 and 0.8 g/cm$^3$, and preferably between about 0.4 and 0.6 g/cm$^3$. When the obtained dry granular product is added to water, the alkaline builder which also functions as a cleaner serves as a dissolving agent for the film-forming material. The water-softening or chelating material, if present, enhances the solubility of the components and chelates any insoluble ions, such as calcium and magnesium, which would tend to cloud the alkaline solution and detract from the shine of the film-forming material. The binder which bonds the individual particles of the alkaline builder, the film-former, and water softener into agglomerates or granules having uniform compositions is selected to readily dissolve in water.

The film-former material can be either an alkali-soluble polymer or resin, a film-forming wax such as a montanester wax in powder form, or a combination of such materials. In the case of the film-forming material being an alkali-soluble polymer or resin, the floor care product when solubilized in water will be a product which cleans and dries to a bright finish. In the event the film-former is primarily a powdered wax, the floor care product when solubilized in water will be a product which cleans and dries without a bright luster, but is buffable to a luster. A composition having intermediate self-shine and buffable characteristics can be obtained by balancing the amount of alkali-soluble resin or polymer and wax utilized in the formation.

More specifically, in providing a floor care product in dry, granular form which when put into water quickly dissolves to give a solution or dispersion which both cleans and shines, an alkaline builder such as sodium carbonate, which is a cleaning agent and which also serves as a dissolving agent for the film-former, is blended with an alkali-soluble polymer or resin such as a styrene-acrylic acid co-polymer, which functions as a film-former and which traps the alkaline builder so that the residue deposited onto a floor is a continuous film which is non-dulling. By changing the ratio of builder to resin, the shining ability of the emulsion can be increased or decreased. The softening or chelating agent, such as sodium hexametaphosphate or an ethylenediamine tetraacetic acid salt will chelate with any insoluble ions which may be present in the dissolving or dispersing water which would tend to cloud the solution of the alkaline builder. Certain chelating agents such as sodium hexametaphosphate will also function as an alkaline builder. The dry materials after being mixed are coated with a binder such as gum arabic, preferably in a fluidized bed granulator, whereby large granules are built by binding or gluing together the powder particles of builder, alkaline-soluble resin, and softening agent. If desired, other components such as surfactants, coalescing or leveling aids, and cosmetic ingredients such as dye and perfumes may be added prior to or at the time of coating with the binder. It is essential in processing the components to provide the dry, granular material having an unpacked bulk density within the range of from about 0.3 to 0.8 $g/cm^3$, preferably about 0.4 to 0.6 $g/cm^3$, and with the granules sufficiently blended so as to provide particles or granules having a uniform composition of film former, alkaline builder, and the optional components. This will ensure a product which has good wetting characteristics, and which is 100% soluble in water at about room temperature.

In the event a self-cleaning, buffable composition is desired rather than a clean and shine product, the major modification in the components and the manner of putting the components together is that the alkali-soluble resin is replaced by a waxy material which is readily dispersible in water (e.g., pre-emulsified montan ester wax or polyethylene wax blends), preferably in combination with a surfactant. The waxy material will perform substantially the same function as the alkali-soluble resin insofar as trapping the alkaline builder and in providing film-forming characteristics. The shine, however, is only obtained by buffing after the product has dried on a hard surface. If it is desired to have a composition which is rebuffable but which has an initial shine, a combination of water-soluble resin and waxy material can be utilized. By adjusting and balancing the amount of alkali-soluble resin with the waxy material, varying degrees of shine and buffability can be obtained.

In producing the dry, granular floor care products, it is essential that the components be blended in order to provide a uniform composition and that the binding of the components with the binder be carried out in order that the uniform composition is retained in the granular mixture. Furthermore, it is essential that the amount of binder be adjusted so that the final granules will have an unpacked bulk density of between 0.3 $g/cm^3$ and 0.8 $g/cm^3$, and preferably from 0.4 to 0.6 $g/cm^3$; and preferably a particle size of between about 100 and 1000 microns, and typically >125 microns and <1000 microns. In the event the granules have a bulk density below about 0.3 $g/cm^3$, the particles will tend to float on top of water, causing the particles to resist solubilization in water. In the event the bulk density is above about 0.8 $g/cm^3$, the particles will tend to be too compact and will settle to the bottom of the container containing the solubilizing water, and will only slowly dissolve. Accordingly, it has been found that the preferred method of providing the dry, granular product to obtain the desired bulk density is to blend the solid powder components in a fluidized bed granulator, and coat the particles with the binder for agglomeration of the powders while the particles are fluidized. However, other methods can be utilized, including spray drying, rotary pan granulation, or drum drying provided the process is controlled to provide granules having the critical bulk density and preferably the controlled particle size.

In practicing the present invention, the film-forming material, in the event of a clean and shine formulation, can include the alkali-soluble polymer or resin commonly employed in bright-drying aqueous floor polishes such as the styrene-acrylic acid co-polymers; styrene-maleic anhydride co-polymers, modified rosin esters, shellac, and other alkali-soluble natural gums. The styrene-acrylic acid co-polymers are preferred. In the event the dry, granular floor care product is to provide a clean and buffable product, the alkali-soluble polymer or resin can be replaced with a solid wax powder such as Hoechst wax which is montanester wax.

The alkaline builders which can be employed in the dry, granular products of the present invention include the sodium or potassium phosphates, polyphosphates, or pyrophosphates; sesquicarbonates which are blends of carbonates and bicarbonates; sodium meta silicates; caustic soda and potash; sodium tetraborate, and the like.

Water-softening or chelating materials which can be utilized include ethylenediamine tetraacetic acid salts; sodium hexametaphosphate, which will also function as an alkaline builder; nitrilo-triacetic-acid salts; the zeolites; the citrates; the tartrates, and the gluconates. These softening agents, as stated hereinbefore, function to complex hardwater salts, i.e., calcium and magnesium ions, which would tend to cloud a carbonate or other aqueous alkaline solution containing the alkaline builders.

The binding agents useful in the present invention include the natural water-soluble gums such as gum arabic, gum acacia, guar gum, gum tragacanth; Protein materials such as casein or zein; emulsion polymers such as polyvinyl acetate and solution polymers; water-soluble polymers such as polyvinyl alcohol and polyvinyl pyrrolidone; alkaline solutions of alkali-soluble resins, such as styrene-acrylic acid and styrene-maleic anhydride; and also solvent soluble binders, such as alcohol solutions of shellac or other resinous materials. It is necessary that the binders be completely soluble in the solubilizing water, either by simple solubility or pH enhancement.

The surfactants which are utilized in helping to disperse or solubilize, and to aid in the binding of the components, preferably are the non-ionic surfactants such as the alkylpolyglycolethers produced from straight chain saturated fatty alcohols containing varying amounts of ethyleneoxide per mole of alcohol, and such surfactants as are commonly employed in floor polishes and the like. As previously stated, the floor care products can also include other optional ingredients such as leveling and coalescing agents such as carbitol, the fluorocarbon leveling agents or the phosphates such as tris(2-butoxyethyl) phosphate, as well as dyes and perfumes.

In the dry, granular floor care and cleaner products of the present invention, ratios of the essential ingredients can vary over a substantial range. However, it has been found that the alkaline builder is preferably present at from 15 to 60% on a weight basis. The film-former is preferably present at from 15 to 80% on a weight basis, and in the event the film-former is an alkali-soluble resin, it is preferably present in an amount of from 20 to 75%; and if the film-former is a waxy material, it preferably will be present at from 20 to 40%. The water-softening component can be present in an amount of from 0 to 30%; and the binder in an amount of from 5 to 50% on a weight basis. As will be apparent to one skilled in the art, the particular percentages will be adjusted to meet the conditions of application and the properties desired. For example, certain of the water-softening or chelating materials will also function as a builder to contribute to the cleaning. In such instances the chelating agent will be added to the amount of builder in defining the total builder content. Certain of the binder materials will also have film-forming properties when the granular product is reconstituted in water. In such instances the binder material will be considered a part of the total film-former material. As a rule of thumb in determining proportions, the proportion of film-former should be higher than the alkaline portion in order to achieve the required shine.

This product is primarily a floor maintainer for use on vinyl and linoleum substrates but can also be used as a cleaner on other substrates such as plastic work surfaces and ceramic tiles. The product may be packaged in any convenient form and is especially contemplated to be packaged in a water soluble polyvinyl alcohol sachet which, upon exposure to water would dissolve.

Having described the invention in general terms, the following two examples will set forth presently preferred embodiments. Example 1 is a clean and shine formulation; and Example 2 is a clean and buff composition.

EXAMPLE 1

The components utilized are as follows:

| Material | % (w/w) | Function |
|---|---|---|
| Sodium Carbonate | 33.34 | alkaline builder |
| Styrene-acrylic Acid Resin* | 33.35 | alkali-soluble resin |
| Sodium Hexametaphosphate | 8.33 | water softener |
| Gum Arabic | 23.305 | binder |
| Carbitol | 1.67 | coalescent |
| Dye | .005 | coloring material |

*Styrene-acrylic acid resin is an emulsion co-polymer of 68% styrene and 32% acrylic acid monomers to provide a resin having an acid value of approximately 198 and a molecular weight of approximately 3000–8000.

The alkaline builder, alkali-soluble resin, and chelating material were charged to the granulator bowl of a fluidized bed granulator such as that manufactured and marketed under the tradename AEROMATIC by Aeromatic, Inc., Towaco, N.J. 07082; the apparatus sealed, and the charged materials fluidized. After being fully fluidized for a period of approximately five minutes, a 25% aqueous polyvinyl alcohol solution carrying the coalescing agent and dye was sprayed onto the fluidized powders through an inlet spray nozzle, with the spraying continued until the specified amount of binder was added. The water from the polyvinyl alcohols quickly evaporated as a result of the fluidized air stream which had an inlet temperature of approximately 55° C. and an outlet temperature of approximately 28° C. After the addition of the binder solution, the granules were dried until they became free flowing and tack free. The resultant granular product had an unpacked bulk density of about 50% (0.50) which means that 100 g/cm$^3$ of product weighs approximately 50 cm$^3$ of unpacked product.

Two ounces (approximately ¼ cup) of the dry product is added to a gallon (one-half bucket) of water to provide an aqueous solution having a pH of about 10.2. The product solubilizes rapidly with 100% of the granular product going into solution. The product, when applied to a floor, provided cleaning equivalent to that obtained with a high-grade commercial household cleaner, and provided a hard, high gloss finish upon drying.

EXAMPLE 2

The components utilized are as follows:

| Material | % (w/w) | Function |
|---|---|---|
| Wax VP KST* | 39.85 | film-forming agent |
| Genapol T-500p** | 28.89 | non-ionic surfactant |
| Sodium Hexametaphosphate | 9.96 | water softener |
| Tetrasodium E.D.T.A. | 1.00 | hardwater salt chelating agent |
| Tetrapotassium pyrophosphate | 19.92 | builder and cleaning aid |
| Polyvinyl alcohol | 0.38 | binder |

*Wax VP KST is a montanester wax manufactured by Hoechst, a West German company, and has an acid number (ASTM D1387) of less than 5; a drop point (ASTM D566) of 55–62 C.; a saponification number (ASTM D1387) of 15, and a density (g/cm$^3$) (ASTM D1298, D1505) of 1.18–1.22 at 20 C.
**Genapol T-500p is a surfactant manufactured by Hoechst and is an alkylpolyglycolether of a straight chain saturated fatty alcohol containing 50 moles of ethylene oxide per mole of alcohol.

The product was granulated in accordance with the procedure defined in Example 1. When the product was applied to a floor, in the ratio defined in Example 1, it dried to a dull finish. Upon buffing the finish became glossy with a bright shine.

The products of the present invention being in granular form and having a controlled bulk density are 100% soluble in water without the addition of any solubilizing agent such as ammonia, the amines or the like. Because of the controlled bulk density, the granules will readily settle in water and become quickly solubilized. The present invention, therefore, provides anhydrous floor care products which can be readily reconstituted in water to provide the beneficial characteristics of the aqueous bright drying, aqueous rebuffable, and aqueous clean and shine products.

As will be apparent to one skilled in the art, various modifications can be made within the scope of the aforesaid description. Such modifications being within the ability of one skilled in the art form a part of the present invention and are embraced by the appended claims.

It is claimed:

1. A dry, granular clean and shine product primarily for floor maintenance having uniformly contained in dry granules from about 15 to 60 percent by weight of an alkaline builder, 15 to 80 percent by weight of a film-former selected from the group consisting of an alkali-soluble polymer, an alkali-soluble resin, a film-forming wax, and mixtures thereof, 0 to 30 percent by weight of a water-softening agent, and 5 to 40 percent by weight of a water-soluble binder selected from the group consisting of natural water-soluble gums, protein materials, an emulsion polymer, water-soluble polymers, alkaline solutions of alkali-soluble resins, solvent-soluble binders that are soluble in water, and mixtures thereof; said granules having an unpacked bulk density of about 0.3 to about 0.8 g/cm$^3$, wherein said product is readily reconstituted as an aqueous floor maintenance composition in water at ambient temperatures without addition of a solubilizing agent, and wherein said water-soluble binder is polyvinylalcohol.

2. A dry, granular clean and shine product primarily for floor maintenance having uniformly contained in dry granules from about 15 to 60 percent by weight of an alkaline builder, 15 to 80 percent by weight of a film-former selected from the group consisting of an alkali-soluble polymer, an alkali-soluble resin, a film-forming wax, and mixtures thereof, 0 to 30 percent by weight of a water-softening agent, and 5 to 40 percent by weight of a water-soluble binder selected from the group consisting of natural water-soluble gums, protein materials, an emulsion polymer, water-soluble polymers, alkaline solutions of alkali-soluble resins, solvent-soluble binders that are soluble in water, and mixtures thereof; said granules having an unpacked bulk density of about 0.3 to about 0.8 g/cm$^3$, wherein said product is readily reconstituted as an aqueous floor maintanance composition in water at ambient temperatures without addition of a solubilizing agent, and wherein said water-soluble binder is gum arabic.

3. A dry, granular clean and shine product primarily for floor maintenance having uniformly contained in dry granules from about 15 to 60 percent by weight of an alkaline builder, 15 to 80 percent by weight of a film-former selected from the group consisting of an alkali-soluble polymer, an alkali-soluble resin, a film-forming wax, and mixtures thereof, 0 to 30 percent by weight of a water softening agent, and 5 to 40 percent by weight of a water-soluble binder selected from the group consisting of natural water-soluble gums, protein materials, an emulsion polymer, water-soluble polymers, alkaline solutions of alkali-soluble resins, solvent-soluble binders that are soluble in water, and mixtures thereof; said granules having an unpacked bulk density of about 0.3 to about 0.8 g/cm$^3$, wherein said product is readily reconstituted as an aqueous floor maintenance composition in water at ambient temperatures without addition of a solubilizing agent, and wherein said clean and shine product includes carbitol as a coalescing agent.

4. A dry, granular clean and shine product primarily for floor maintenance having uniformly contained in dry granules from about 15 to 60 percent by weight of an alkaline builder, 15 to 80 percent by weight of a film-former selected from the group consisting of an alkali-soluble polymer, an alkali-soluble resin, a film-forming wax, and mixtures thereof, 0 to 30 percent by weight of a water-softening agent, and 5 to 40 percent by weight of a water-soluble binder selected from the group consisting of natural water-soluble gums, protein materials, an emulsion polymer, water-soluble polymers, alkaline solutions of alkali-soluble resins, solvent-soluble binders that are soluble in water, and mixtures thereof; said granules having an unpacked bulk density of about 0.3 to about 0.8 g/cm$^3$, wherein said product is readily reconstituted as an aqueous floor maintenance composition in water at ambient temperatures without addition of a solubilizing agent, and wherein said water-softening agent is sodium hexametaphosphate.

5. A dry, granular clean and shine product primarily for floor maintenance having uniformly contained in dry granules from about 15 to 60 percent by weight of an alkaline builder, 15 to 80 percent by weight of a film-former selected from the group consisting of an alkali-soluble polymer, an alkali-soluble resin, a film-forming wax, and mixtures thereof, 0 to 30 percent by weight of a water-softening agent, and 5 to 40 percent by weight of a water-soluble binder selected from the group consisting of natural water-soluble gums, protein materials, an emulsion polymer, water soluble polymers, alkaline solutions of alkali-soluble resins, solvent-soluble binders that are soluble in water, and mixtures thereof; said granules having an unpacked bulk density of about 0.3 to about 0.8 g/cm$^3$, wherein said product is readily reconstituted as an aqueous floor maintenance composition in water at ambient temperatures without addition of a solubilizing agent, and wherein said water-softening agent is an ethylenediamine tetraacetic acid salt.

6. A dry, granular clean and shine product readily reconstituted as an aqueous floor maintenance product in water at ambient temperatures without addition of a solubilizing agent having uniformly contained in dry granules from about 15 to 60 percent by weight of an alkaline builder, 15 to 80 percent by weight of a film-former selected from the group consisting of styrene-acrylic acid resin, montan ester wax, and mixtures thereof, 0 to 30 percent by weight of a water softening agent, and 5 to 40 percent by weight of water-soluble binder selected from the group consisting of gum arabic, polyvinyl alcohol, and mixtures thereof; and said binder in sufficient amount to provide said granules with an unpacked bulk density of from about 0.3 to 0.8 g/cm$^3$.

7. A process for making a dry, granular clean and shine product, comprising: blending together a powdered alkaline builder and a powdered film-forming material, and adding an effective amount of a water-soluble binder to the resultant blend, while maintaining the blending step, for producing water-soluble granules having a substantially uniform composition and an unpacked bulk density of between about 0.3 and about 0.8 g/cm$^3$, wherein said product is readily solubilized in water to provide a solution which both cleans and shines.

* * * * *